(12) United States Patent
Yang

(10) Patent No.: US 8,613,685 B1
(45) Date of Patent: Dec. 24, 2013

(54) DIFFERENTIAL WITH ACTIVE TORQUE VECTORING

(76) Inventor: Lei Yang, Novi, MI (US)

( * ) Notice: Subject to any disclaimer, the term of this patent is extended or adjusted under 35 U.S.C. 154(b) by 0 days.

(21) Appl. No.: 13/136,838

(22) Filed: Aug. 13, 2011

(51) Int. Cl.
*F16H 48/06* (2006.01)

(52) U.S. Cl.
USPC .......................................... 475/220

(58) Field of Classification Search
USPC ............................ 475/220, 252, 248, 230, 251
See application file for complete search history.

(56) References Cited

U.S. PATENT DOCUMENTS

| | | | |
|---|---|---|---|
| 6,402,656 B1 * | 6/2002 | Peralta | 475/252 |
| 7,097,585 B2 * | 8/2006 | Nishiji | 475/248 |
| 7,238,140 B2 | 7/2007 | Gradu | |
| 7,503,866 B2 | 3/2009 | Puiu | |
| 7,641,581 B2 * | 1/2010 | Yamazaki | 475/252 |
| 7,708,665 B2 | 5/2010 | Wheals | |
| 7,811,194 B2 | 10/2010 | Bowen | |
| 7,896,771 B2 | 3/2011 | Bowers | |
| 2003/0195077 A1 * | 10/2003 | Liu | 475/248 |
| 2010/0075795 A1 * | 3/2010 | Krude et al. | 475/220 |
| 2010/0285917 A1 * | 11/2010 | Rahm | 475/220 |

* cited by examiner

*Primary Examiner* — Justin Holmes
*Assistant Examiner* — Stacey Fluhart

(57) ABSTRACT

A differential with torque vectoring comprises a differential, a motor, and a clutch. The pinion gears are constantly coupled to the motor shaft. Energizing the motor provides torque vectoring. Energizing the clutch provides differential lock. The differential with torque vectoring can also functions as conventional open differential.

1 Claim, 17 Drawing Sheets

US 8,613,685 B1

DIFFERENTIAL WITH ACTIVE TORQUE VECTORING

FIELD OF INVENTION

The invention relates generally to the automotive differential and active torque vectoring and vehicle yaw control.

BACKGROUND OF THE INVENTION

The conventional open differential of the automotive vehicles can lose traction when there is slippery condition on the surface, where the vehicles drive. Many torque vectoring designs are implemented to overcome traction loss. They are incorporated with clutch in some ways. They are effective, though clutch is discrete in nature. It is either open and transfers zero torque, or closed and transfers 100% of the torque. Its activating time from open to close is not minimum.

SUMMARY OF THE INTERVENTION

The present invention relates to a design and implementation of active differential for automotive vehicles. It comprises a regular differential familiar to those in the field, a motor, a gear mechanism, and a clutch. It can function as conventional open differential. It can also apply torque for vehicle yaw control.

BRIEF DESCRIPTION OF THE DRAWINGS

FIG. 31) is a perspective view of the other side gear meshed with the other set of the pinion gears of the differential.

DETAILED DESCRIPTION OF THE EMBODIMENTS

Figure 1:
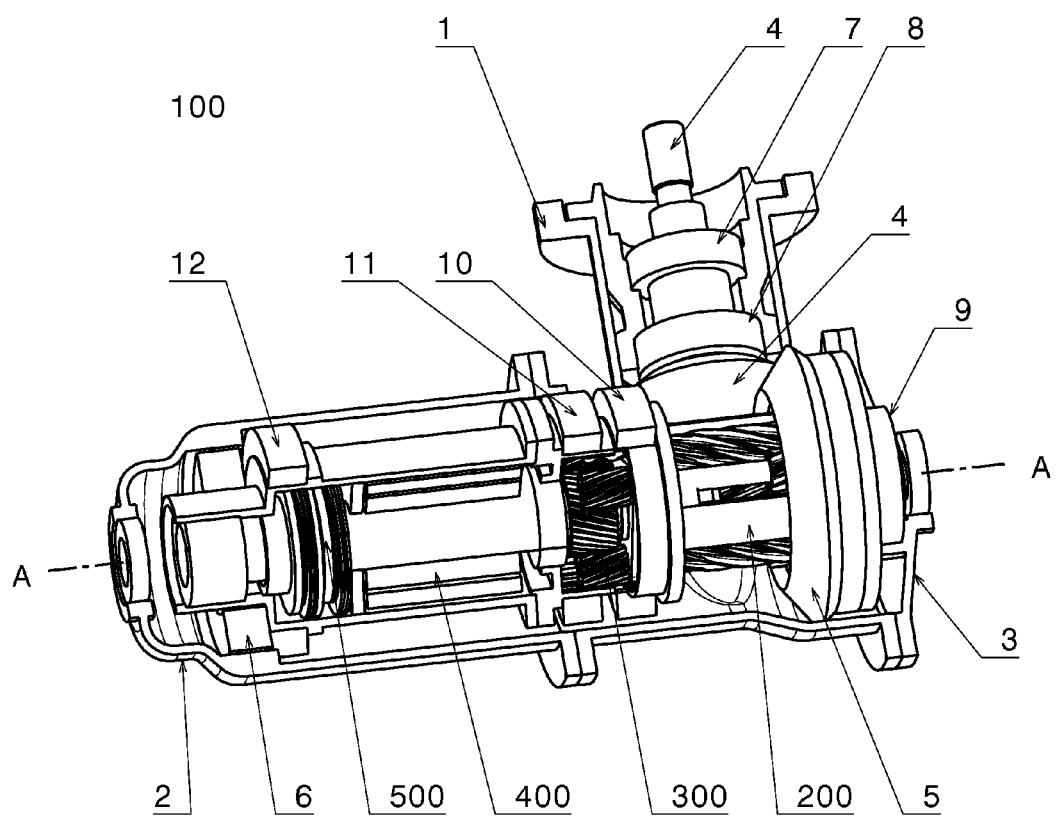
FIG. 1 is a perspective view of the vehicle axle in one embodiment.

FIG. 1 shows a vehicle axle 100. It composes an axle housing 1, an axle housing 2, a cover 3, an input gear 4, a gear 5, a differential 200, a planetary gear assembly 300, a motor 400, a clutch 500, and a coil 6. The axle housing 1, 2, and the cover 3 are firmly connected with screws (not shown). The input gear 4 is pivotally supported with a bearing 7 and a bearing 8 inside the axle housing 1. The differential 200 is pivotally supported with a bearing 9 and a bearing 10 inside the axle housing 1. The motor 400 is supported with a bearing 11 and a bearing 12 inside the axle housing 1 and 2. The differential 200 and the motor 400 rotate about an axis A.

Figure 2:
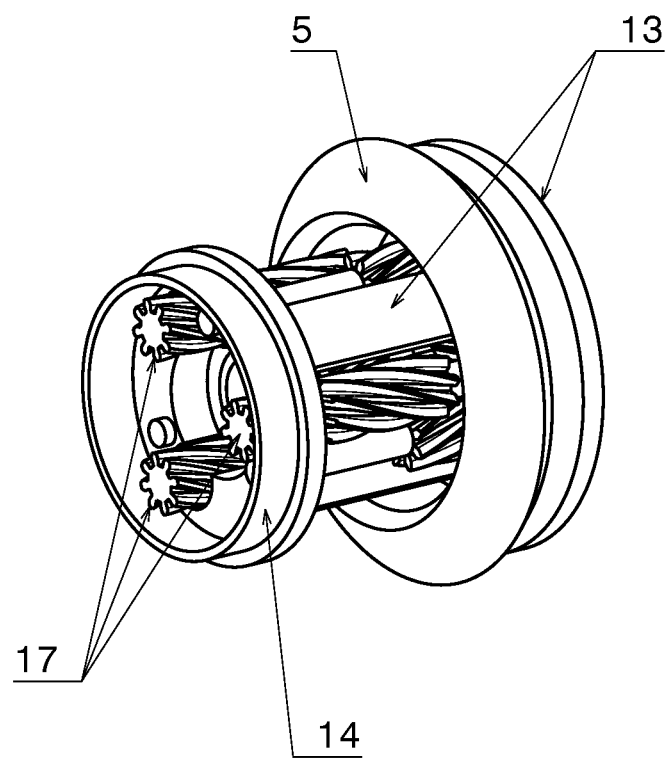
FIG. 2 is a perspective view of the differential of the vehicle axle.
Figure 3A:
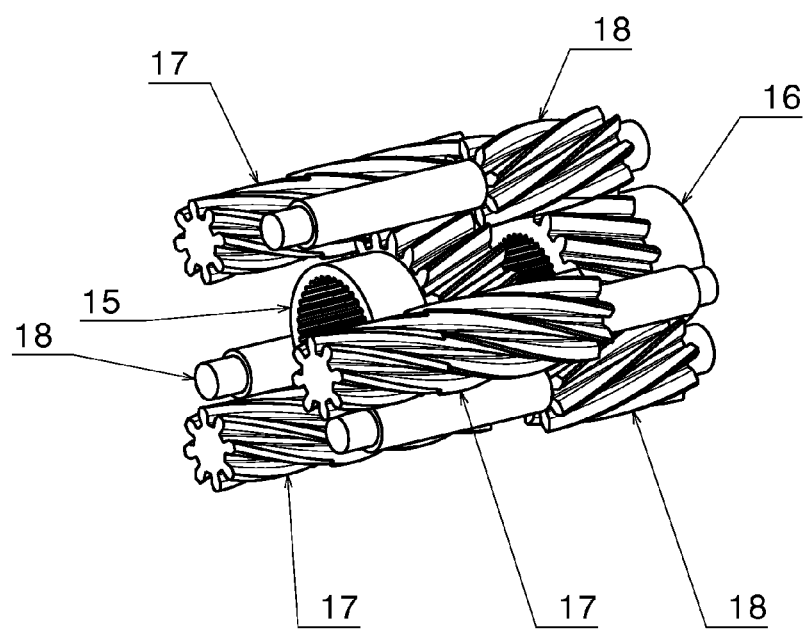
FIG. 3A is a perspective view of the side gears, the sets of the pinion gears of the differential.
Figure 3B:
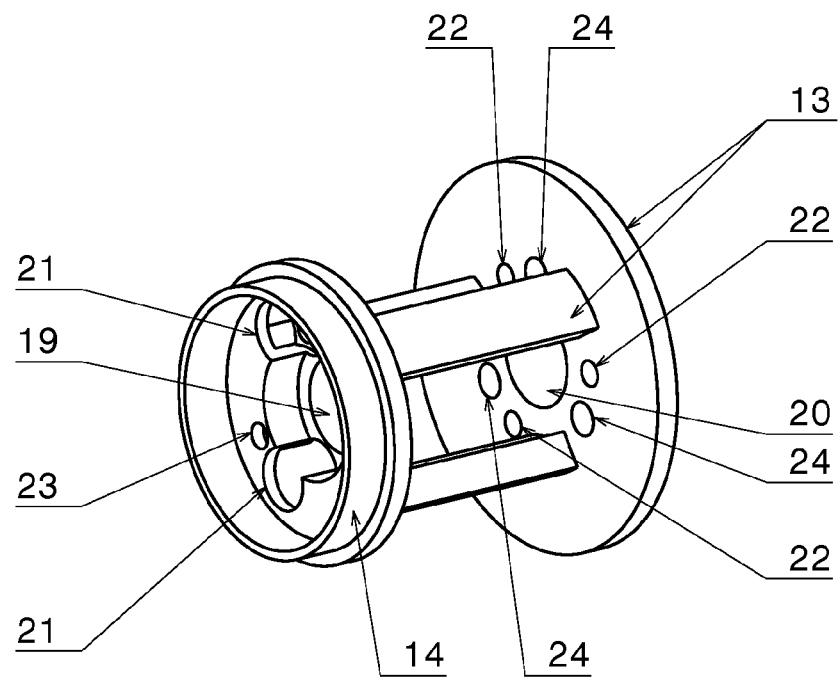
FIG. 3B is a perspective view of the differential housing and differential cover of the differential of FIG. 2.
Figure 3C:
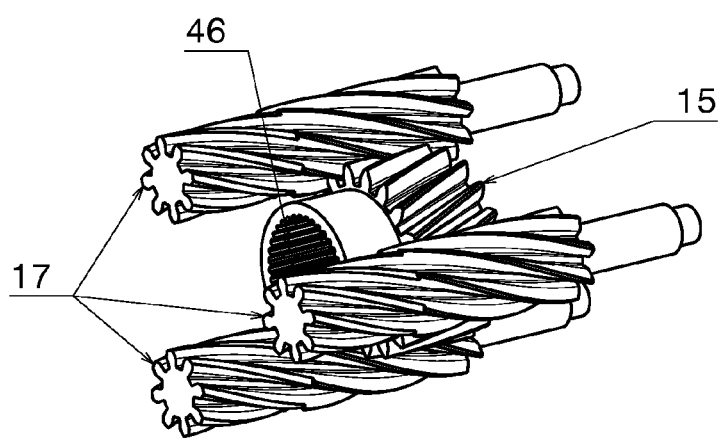
FIG. 3C is a perspective view of one side gear meshed with one set of pinion gears of the differential.
Figure 3D:
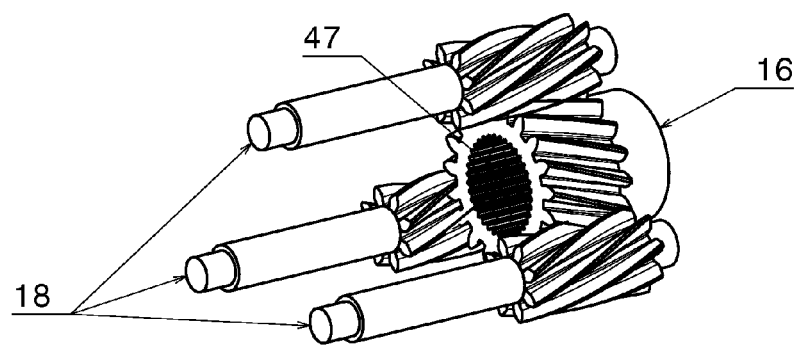
FIG. 3E is a perspective view of one pinion gear of the set of pinion gears meshed with one pinion gear of the other set of pinion gears.
FIG. 3F is a perspective view of the input gear meshed with the gear, the gear being firmly connected to the differential as explained in the specification.
Figure 3E:
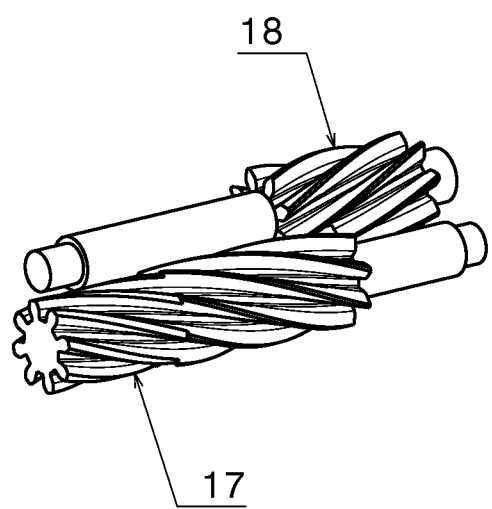
Figure 3F:
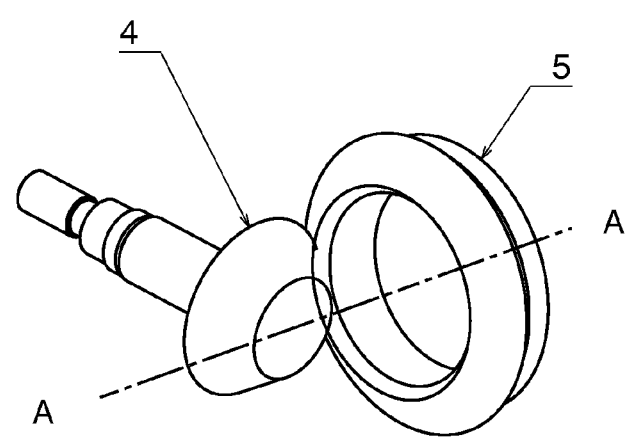

Referring to FIG. 2, FIG. 3A, and FIG. 3B, the differential 200 comprises a differential housing 13, a differential cover 14, a side gear 15, a side gear 16, a set of pinion gears 17, and a set of pinion gears 18. The differential housing 13 and the differential cover 14 are firmly connected to each other with screws (not shown). The side gear 15 is pivotally located in a bore 19 at the center of the differential cover 14. The side gear 16 is pivotally located in a bore 20 at the center of the differential housing 13. The side gear 15 and 16 are located coaxial, and can rotate about the axis A. The side gear 15 and 16 are cylindrical helical gears. The set of pinion gears 17 are pivotally located in a set of bores 21 on the differential housing 13 and a set of bores on the differential cover 14. The set of pinion gears 18 are pivotally located in a set of bores 23 on the differential housing 13 and a set of bores 24 on the differential cover 14. In this embodiment, there are three pinion gear 17 and three pinion gear 18. The pinion gears 17 and 18 are cylindrical, helical gears. In this embodiment, the axis of the pinion gears 17 and 18 are parallel to the axis A. Referring to FIG. 3C, the pinion gears 17 mesh with the side gear 15. Referring to FIG. 3D, the pinion gears 18 mesh with the side gear 16. Referring to FIG. 3E, the pinion gears 17 and 18 are paired, e.g. one pinion gear 17 meshes with one pinion gear 18. Referring to FIG. 2, the gear 5 is firmly connected to the differential housing 13 with screws (not shown) or other means, like welding. Referring to FIG. 3F, the input gear 4 meshes with the gear 5 (gear teeth are not shown). In this embodiment, the input gear 4 and the gear 5 are bevel gears.

Referring to FIG. 3C, the side gear 15 has spline 46 in its bore. A shaft (not shown) is rotationally drivingly coupled to the side gear 15 through the spline 46 at one end, while the other end coupled, for an example, to a wheel of the vehicle axle 100. Referring to FIG. 3D, the side gear 16 has spline 47 in its bore. Another shaft (not shown) is rotationally driving coupled to the side gear 16 through the spline 47 at one end, while the other end coupled, for an example, to the other wheel of the vehicle axle 100.

Figure 4A:
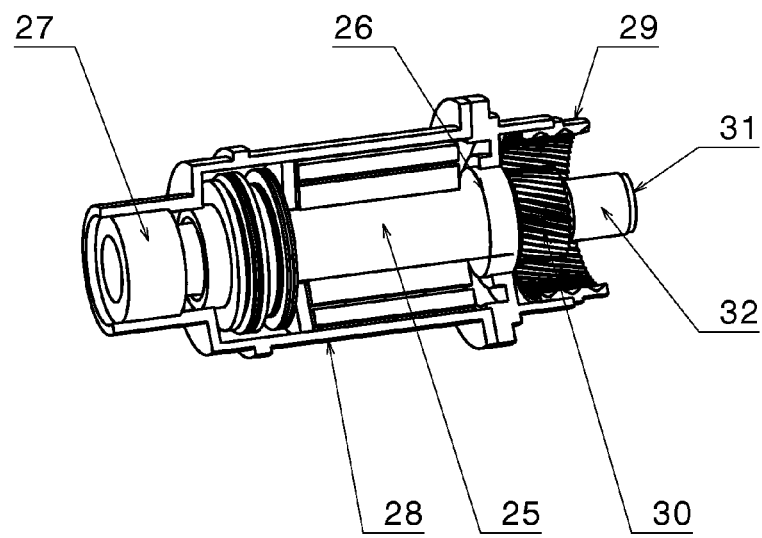
FIG. 4A is a perspective view of the motor assembly of the vehicle axle of FIG. 1.
Figure 4B:
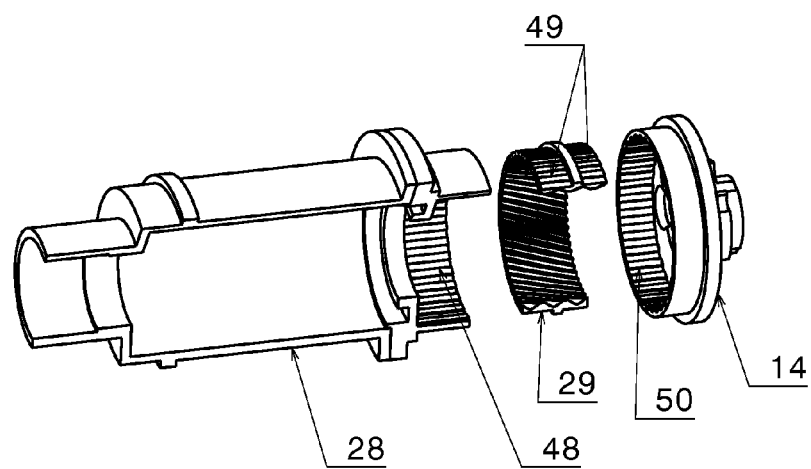
FIG. 4B is a perspective view of the motor housing, the differential cover, the piece with internal gear teeth.
Figure 4C:
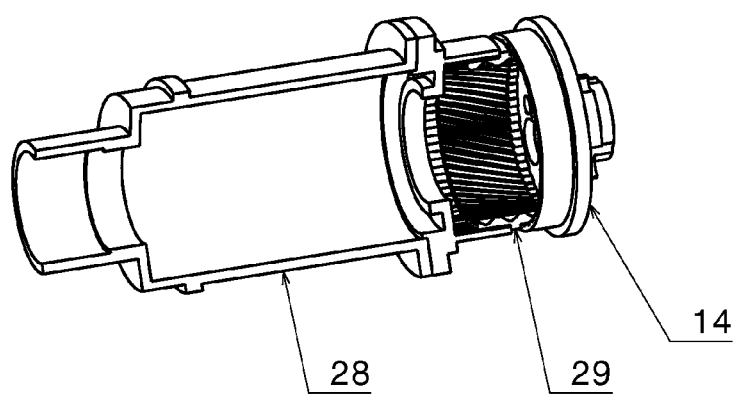
FIG. 4C is a perspective view of housing, the differential cover, and the piece being assembled together.
Figure 5A:
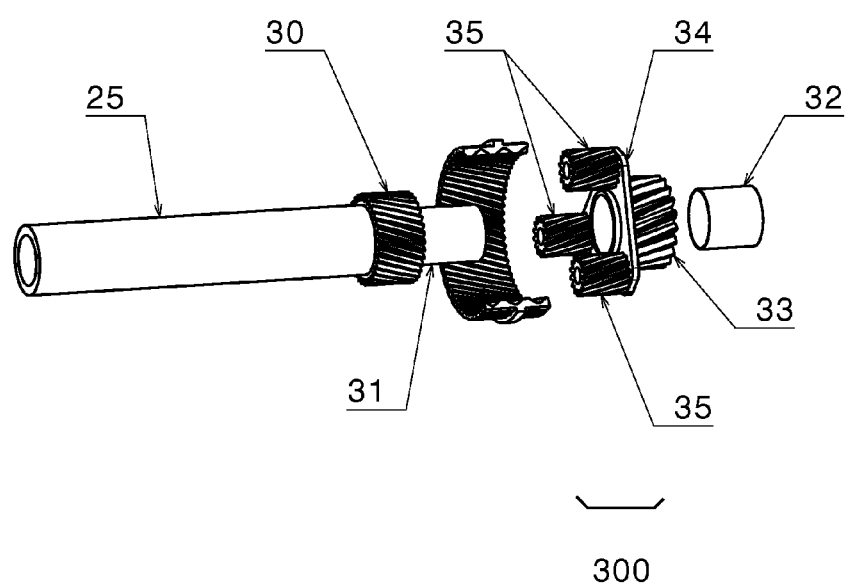
FIG. 5A is a perspective view of the motor shaft, the piece, the planetary gear assembly, and the needle bearing.
Figure 5B:
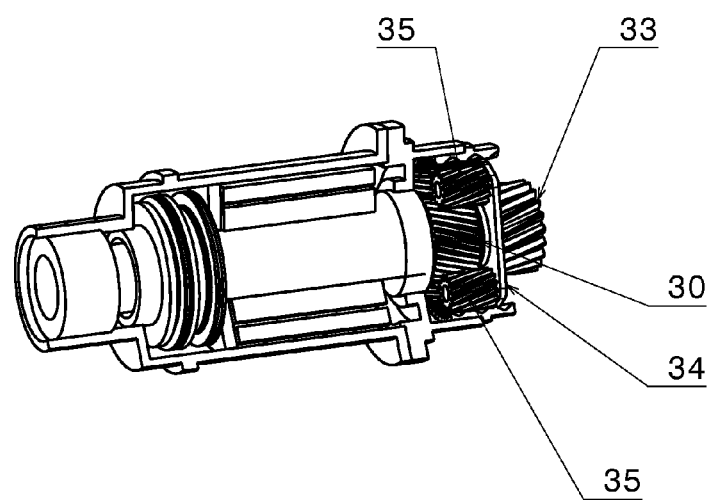
FIG. 5B is a perspective view of the motor assembly, the piece, and the planetary gear assembly being assembled together.
Figure 6A:
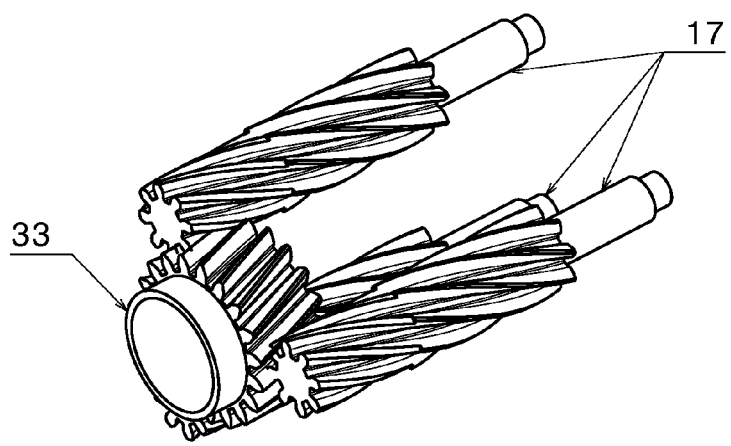
FIG. 6A is a perspective view with the engaging gear of the planetary gear assembly meshed with one set of the pinion gears.

Referring to FIG. 4A, the motor shaft 25 is pivotally supported with the bearing 26 and 27 in the motor housing 28. The motor housing 28 is connected to the differential cover 14 through a piece 29 such that the motor housing 28 rotates together with the differential 200. As an example, such connection can be made through interlocking of spline 48 on the motor housing 28, spline 49 on the piece 29, and spline 50 on the cover 14 as shown in FIG. 4B, FIG. 4C shows the motor housing 28, the piece 29, and the differential cover 14 after they are assembled together. Please note that a portion of the motor housing 28, a portion of the piece 29 are cut away for display purpose. The piece 29 is an internal gear. Referring to FIG. 5A, a gear 30 is integral to the motor shaft 25 and located at one end of the motor shaft 25. The motor shaft 25 has a journal 31 at this end. A planetary gear assembly 300 is pivotally supported with a needle bearing 32 on the journal 31. The engaging gear 33 of the planetary gear assembly 300 is firmly connected to the carrier 34 of the planetary gear assembly 300. A set of planetary gears 35 are pivotally located on the carrier 34. The planetary gears 35 mesh with the gear 30 and the internal gear teeth on the piece 29. FIG. 5B shows the planetary gear assembly 300, the piece 29 assembled to the motor 400. Referring to FIG. 6A, the engaging gear 33 meshes with the pinion gears 17. When the motor shaft 25 rotates relative to the motor housing 28, the rotational speed of the engaging gear 33 is reduced compared to the rotational speed of the motor shaft 25 while the torque transferred from the motor shaft 25 to the engaging gear 33 is increased.

Referring to FIG. 1, the clutch 500 is located at the other end of the motor shaft 25. The coil 6 is located in the axle housing 2 near the clutch 500. When the coil 6 is de energized, the clutch 500 let the motor shaft 25 and the motor housing 28 disengage with each other. The motor shaft 25 can rotate relative to the motor housing 28. When the coil 6 is energized, the clutch 500 let the motor shaft 25 and the motor housing 28 engage with each other. The motor shaft 25 can not rotate relative to the motor housing 28. The motor shaft 25 can rotate along with the motor housing 28.

Figure 8:
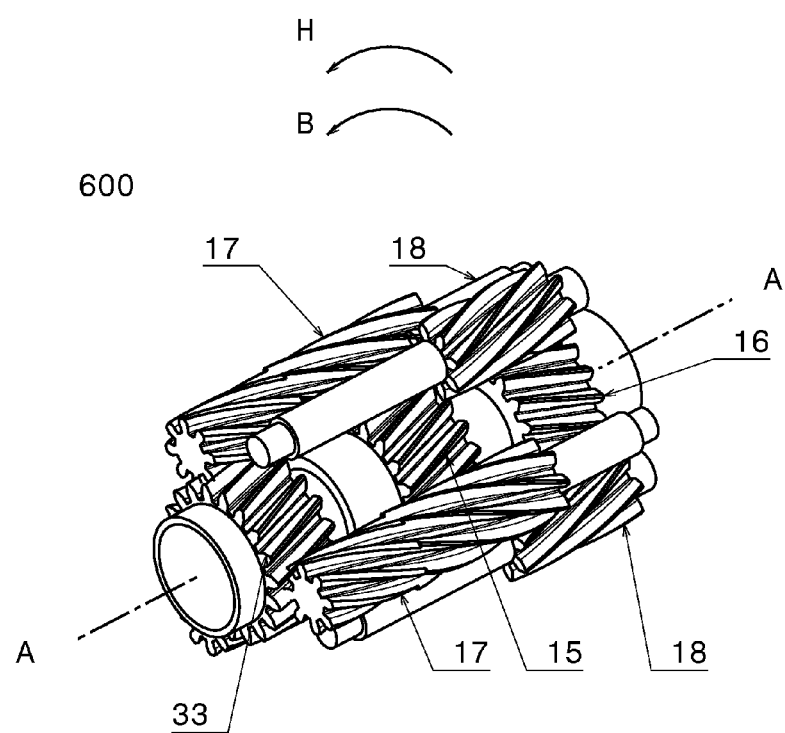
FIG. 8 is a perspective view of the gear mechanism in another scenario.

FIG. 8 shows a gear mechanism 600 composed of the side gear 15, the side gear 16, the pinion gears 17, the pinion gears 18, and the engaging gear 33 in one embodiment. A first scenario is when the motor 400 and the coil 6 are de-energized. When the vehicle drives straight, forward on pavement, and there is no slippery between the wheels and the surface of the pavement, a driving torque H is transferred from the input gear 4 through the gear 5, the differential housing 13 and the differential cover 14 (not shown in FIG. 8), the pinion gears 17 and 18, onto the side gear 15 and 16, and continuously onto the wheels through the respective shafts. The driving torque H is evenly distributed between the side gear 15 and 16. The driving torque meets the resistant torque from the surface of the pavement to the wheels. From Newton's third law, the driving torque pushes the pavement rearward while the resistant torque pushes the vehicle forward. The differential housing 13 and the differential cover 14 rotate with a speed B. The side gear 15 and 16 rotate along with the differential housing 13 and the differential cover 14 with the same rotational speed. The pinion gears 17 and 18 rotate along with the differential housing 13 and the differential cover 14 with the same rotational speed as that of the differential housing 13 and the differential cover 14. They do not rotate about their own axis. Being driven by the pinion gears 17, the engaging gear 33 rotates along with the differential housing 13 and the differential cover 14 with the same rotational speed as that of the side gear 15 and the differential housing 13 and the differential cover 14.

When the vehicle makes turns on pavement, one wheel rotates slower than the other wheel. The wheel, which will rotate slower, meets an additional resistant torque. The additional resistant torque makes the wheel rotate slower. The additional resistant torque is transferred through the shaft connected to the wheel, the side gear connected to the shaft through spline, the pinion gears, the other side gear and shaft onto the other wheel. The additional resistant torque transferred makes that wheel rotate faster. The pinion gears 17 and 18 rotate about their axis while rotating along with the differential housing 13 and the differential cover 14. The side gear 15 and 16 rotate at different rotational speed than that of the differential housing 13 and the differential cover 14. Being driven by the pinion gears 17, the engaging gear 33 rotates at differential rotational speed than that of the differential housing 13 and the differential cover 14. Driving the engaging gear 33 by the pinion gears 17 does not require a lot of torque since the connected planetary gear assembly 300 and the motor 400 rotate freely in this scenario. This is equivalent to the conventional open differential as understood by those skilled in the art.

When the vehicle drives on surface other than pavement, and there might be slippery condition. Often, the surface can not provide resistant torque which matches the driving torque, and one or multiple driving wheels lose traction. If one of the wheels of the vehicle axle 100 loses traction and runs into free spin momentarily, and the resistant torque still push the other wheel forward, the vehicle will get a sudden, unexpected rotation in yaw followed by losing traction on both wheels.

A second scenario is when the motor 400 is de-energized, the coil 6 is energized. The motor housing 28 and the motor shaft 25 are coupled to each other through the clutch 500 when the coil 6 is energized, hence they rotate with the same speed, so do the differential housing 13 and the differential cover 14. The piece 29 and the gear 30 rotate with the same speed as that of the motor housing 28, the motor shaft 25. Thus the planetary gears 35 rotate along with the gear 30 and the piece 29, so does the engaging gear 33. Being engaged with the differential housing 13, the differential cover 14, and the engaging gear 33, the pinion gears 17 rotate along with the differential housing 13, the differential cover 14, and the engaging gear 33. The pinion gears 17 do not rotate about their own axis. Driven by the pinion gears 17, the side gear 15 rotates along with the pinion gears 17, the differential housing 13, and differential the cover 14. Being engaged with the differential housing 13, the differential cover 14, and the pinion gears 17, the pinion gears 18 rotate along with the differential housing 13, the differential cover 14, and the pinion gears 17. The pinion gears 18 do not rotate about their own axis. Driven by the pinion gears 18, the side gear rotates along with the pinion gears 18, the differential housing 13, and the differential cover 14. This is equivalent to the conventional differential lock as understood by those skilled in the art. It can be used to regain traction when one of the wheels encounter slippery condition and lose traction.

Figure 6B:
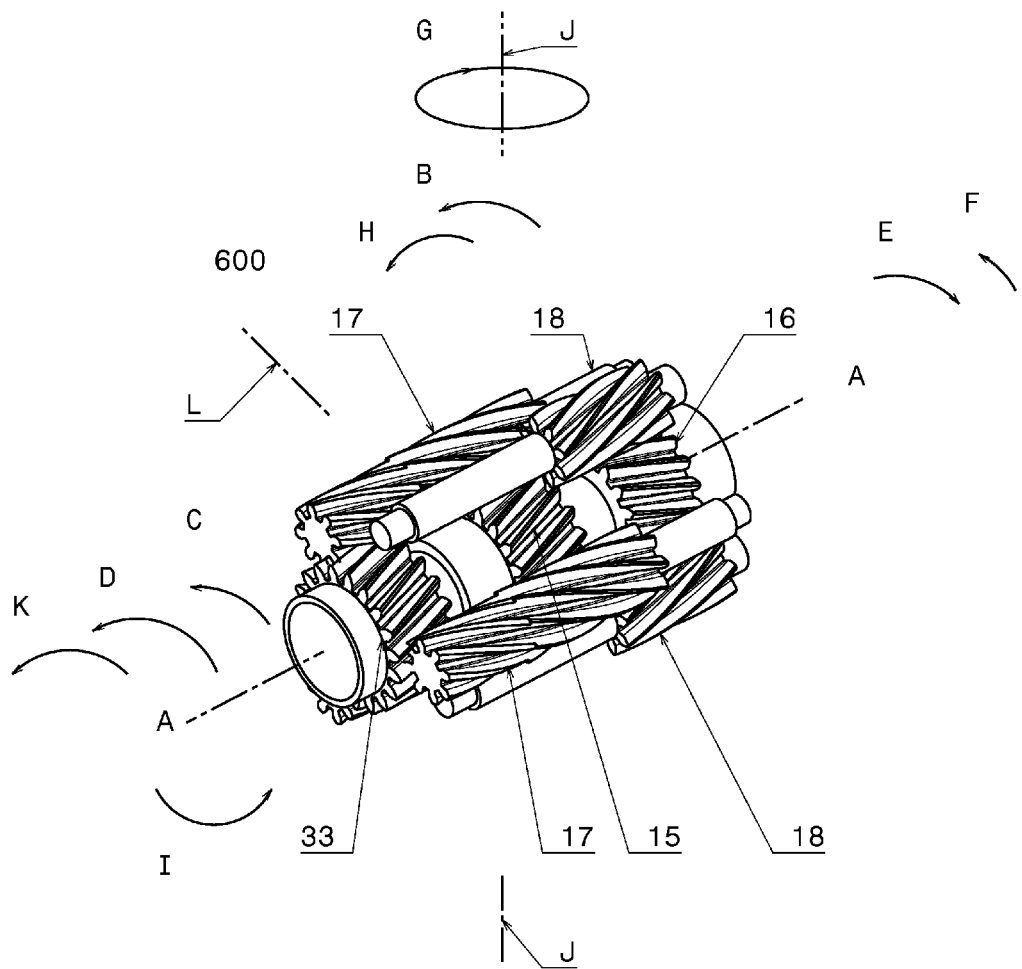
FIG. 6B is a perspective view of the gear mechanism in one scenario.
Figure 7:
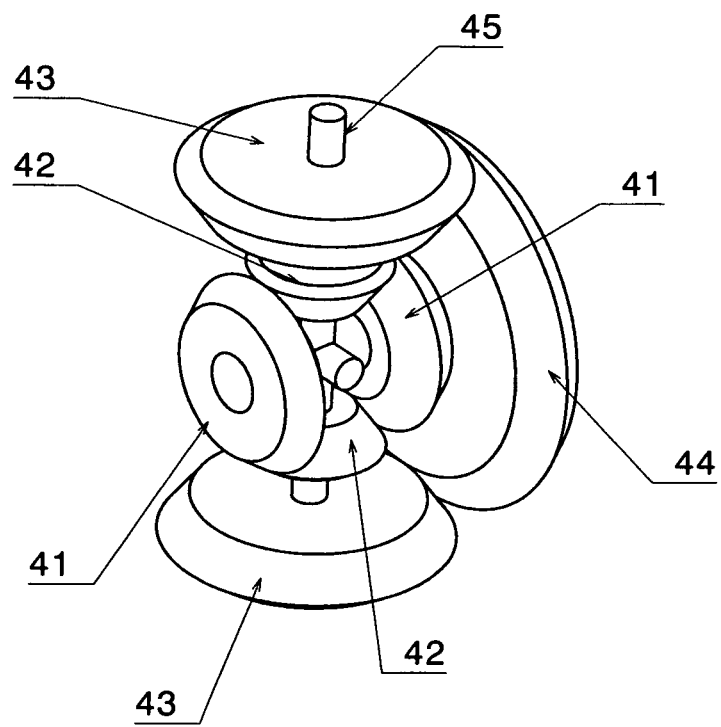
FIG. 7 is deleted.

A third scenario is when the motor 400 is energized, the coil 6 is de-energized. The motor shaft 25 can rotate in one direction relative to the motor housing 28 or in the opposite direction depending on the electric circuit connection. Referring to FIG. 6, a torque K from the motor 400 is transferred to the side gear 15 through the planetary gear assembly 300, the engaging gear 33 and the pinion gears 17, and to the side gear 16 through the planetary gear assembly 300, the engaging gear 33, the pinion gears 17, 18. The torque K is superimposed to the driving torque H. One example is when the differential 200 is driven by the input gear 4 through the gear 5 and rotates with the speed B, the engaging gear 33, which is driven by the motor 400 through the planetary gear assembly 300 with speed C, drives the pinion gears 17. The speed C is of the same rotation direction to that of the speed B. The engaging gear 33, being driven by the motor 400 and the planetary gear assembly 300 with a speed C relative to the differential housing 13 and the differential cover 14, drives the pinion gears 17. The pinion gears 17, being driven by the engaging gear 33 and rotating about each own pivotal axis individually, drive the side gear 15 with a speed I. The speed I is proportional to the speed C, and of the same rotation direction. Thus the side gear 15 rotates with a speed D, which is the addition of the speed B and I.

The pinion gears 17 also drive the side gears 16 with a speed F through the pinion gears 18. The speed E is proportional to the speed C, but opposite in rotation direction. Thus the side gear 16 rotates with a speed F, which is the subtraction of the speed E from the speed B. The side gear 15 and 16 rotate with the different speed D and F, hence the connected wheels, a yaw G about the axis J is introduced consequently. The axis J is perpendicular to the axis A and L. The axis is the fore-aft axis of the vehicle, in which the vehicle axle 100 resides.

This invention provides to automotive driving a design and implementation of automotive differential combining conventional open differential, differential lock, and torque vectoring all together. The torque vectoring is applied to the pinion gears of the differential. The motor, which provides torque vectoring, is connected constantly to the pinion gears of the differential. The motor provides torque vectoring in addition to the driving torque. There is no clutch involving torque vectoring except differential locking, hence the torque vectoring provided is continuous instead of discrete. The torque vectoring can be applied in very short time as the motor becomes energized.

What is claimed is:

1. A vehicle axle comprising:
   (a) a motor housing;
   (b) a differential housing, a differential cover;
   (c) said differential housing and said differential cover are firmly connected to each other;
   (d) said differential housing and said differential cover are pivotally located in said housing;
   (e) a first side gear pivotally located in said differential housing and said differential cover;
   (f) a second side gear pivotally located in said differential housing and said differential cover;
   (g) said first side gear, said second side gear, said differential housing, and said differential cover are co-axial;
   (h) a first set of pinion gears pivotally located in said differential housing and said differential cover;
   (i) a second set of pinion gears pivotally located in said differential housing and said differential cover;
   (j) pivot axes of each of said first pinion gears are parallel to a pivot axis of said first side gear;
   (k) a pivot axis of each of said second pinion gears are parallel to a pivot axis of said second side gear;
   (l) said first set of pinion gears mesh with said first side gear;
   (m) said second set of pinion gears mesh with said second side gear;
   (n) said first pinion gears mesh with said second pinion gears in pairs;
   (o) an engaging gear pivotally located in said housing;
   (p) said ganging gear is co-axial with said first side gear, said second side gear, said differential housing, and said differential cover;
   (q) said engaging gear meshes with said first set of pinion gears;
   (r) a motor is pivotally located in said motor housing;
   (s) a shaft of said motor is co-axial with the pivot axes of said first side gear, said second side gear, said differential housing, and said differential cover;
   (t) said engaging gear is coupled to said shaft of said motor;
   (u) a motor housing is firmly connected to said differential housing and said differential cover.

* * * * *